United States Patent
Heschel et al.

(10) Patent No.: US 6,300,466 B1
(45) Date of Patent: Oct. 9, 2001

(54) PRODUCTION OF ACTIVATED CARBON FROM POLYMERS WITH AROMATIC NUCLEI

(75) Inventors: Wolfgang Heschel, Freiberg; Dirk Müller, Zwickau, both of (DE)

(73) Assignee: Helsa-Werke Helmut Sandler GmbH & Co. KG, Gefrees (DE)

( * ) Notice: Subject to any disclaimer, the term of this patent is extended or adjusted under 35 U.S.C. 154(b) by 0 days.

(21) Appl. No.: 09/554,157

(22) PCT Filed: Nov. 25, 1998

(86) PCT No.: PCT/DE98/03513

§ 371 Date: May 9, 2000

§ 102(e) Date: May 9, 2000

(87) PCT Pub. No.: WO99/28234

PCT Pub. Date: Jun. 10, 1999

(30) Foreign Application Priority Data

Nov. 27, 1997 (DE) .............................................. 197 52 593

(51) Int. Cl.⁷ ................................ C08F 6/12; C08G 75/24
(52) U.S. Cl. ..................... 528/481; 528/486; 528/502 A; 528/503
(58) Field of Search .................................... 528/481, 486, 528/502 A, 503

(56) References Cited

U.S. PATENT DOCUMENTS 3,158,583  11/1964  Corte et al. .

FOREIGN PATENT DOCUMENTS

| 63768 | 11/1968 | (DE) . |
|---|---|---|
| 0 285 321 A2 | 10/1988 | (EP) . |
| 0 326 271 | 8/1989 | (EP) . |
| 2 687 941 | 9/1993 | (FR) . |
| 2 280 898 A | 2/1995 | (GB) . |
| 52030800 | 3/1977 | (JP) . |
| 53050088 | 5/1978 | (JP) . |
| 62197308 A | 9/1987 | (JP) . |
| 2077479 | 4/1997 | (SU) . |
| WO 96/21616 | 7/1996 | (WO) . |

OTHER PUBLICATIONS

Sentek, et al., "Manufacture of a Carbon Sorbent for Medical Use", *Przem. Chem*, 72(5): 205–7 (1993) (Abstract).
Artyushenko, et al., "Activation of a Styrene–Divinylbenzene Copolymer in a Fluidized Bed", *Khim. Tekhnol* (Kiev), (6): 45–51 (1988) (Abstract).

*Primary Examiner*—Duc Truong
(74) *Attorney, Agent, or Firm*—Hoffmann & Baron, LLP

(57) ABSTRACT

Proposed is a process for the production of activated carbon, in which the characteristics of the activated carbon are specifically controllable by way of adjustment of the parameters of the process.

64 Claims, No Drawings

PRODUCTION OF ACTIVATED CARBON FROM POLYMERS WITH AROMATIC NUCLEI

BACKGROUND OF INVENTION

The present invention concerns the production of activated carbon from polymers with aromatic nuclei, in particular styrene-divinylbenzene copolymers.

Activated carbons have long been known and have a wide range of uses in the area of cleaning and purifying flue gases and waste water or sewage, such use being based on the high adsorption capability of the activated carbon. In general activated carbons have a wide adsorption spectrum. Such activated carbons are not optimised for a specific situation of use, but instead are to be inexpensively manufactured as a mass-produced product.

In contrast high-efficiency activated carbons are optimised for specific situations of use and involve correspondingly higher production costs.

It has been known for some years, for the production of activated carbons, to use polymers with aromatic nuclei, in particular styrene-divinylbenzene copolymers, as the staring materials.

EP 0 326 271 B1 discloses the production of activated carbon, in particular from styrene-divinylbenzene copolymers, wherein the copolymer is firstly treated with a large excess of fuming sulphuric acid or oleum for a prolonged period of time. After sulphonation has been effected, the polysulphonated copolymer is washed to remove excess acid and then dried. The activated carbons obtained have a multi-mode pore size distribution, that is to say the disclosed activated carbon simultaneously has pores of different pore sizes, although there is no disclosure of controlling the pore size distribution or appropriate influencing thereof.

WO 96/21616 discloses a process in which a styrene-divinylbenzene copolymer is pyrolysed or subjected to low-temperature carbonisation with 5 to 50% sulphuric acid at a temperature of up to 750° C. In contrast to the polysulphonation of the aromatic nuclei, which is the aim in EP 0 326 271 B1, as a preliminary step for the production of activated carbon, the amount of sulphuric acid to be used in accordance with WO 96/21616 is not even sufficient for complete monosulphonation of all aromatic nuclei. That however results in a comparatively high loss of mass during the pyrolysis operation, which means that the process is comparatively cost-intensive by virtue of the low level of yield. The pore size or the pore size distribution in the case of the activated carbon in accordance with WO 96/21616 are not mentioned.

SUMMARY OF THE INVENTION

Now, the object of the present invention is to provide a process for the production of activated carbon from polymers with aromatic nuclei, in particular styrene-divinylbenzene copolymers, which is economical to carry out and which results in activated carbon with improved properties.

DETAILED DESCRIPTION OF THE INVENTION

That object is attained by the process as set forth in the opening part of this specification, with the following steps:

a) sulphonating the polymer with aromatic nuclei with concentrated $H_2SO_4$, wherein the ratio of the mass of the concentrated $H_2SO_4$ used to the mass of the polymer used is between 0.5:1 and 4:1, b) filtering off the excess sulphuric acid after the sulphonation operation and coking or pyrolysing the sulphonated product; and optionally c) activating the coke obtained by the coking or pyrolysing operation.

In that respect it is particularly preferred if in step a) the ratio of the mass of the concentrated $H_2SO_4$ used to the mass of the polymer used is between 1:1 and 4:1.

A particular advantage of the process according to the invention is that, after sulphonation has been effected, the polymer only has to be subjected to the filtration step in respect of the excess sulphuric acid, and the polymer does not have to be washed, while at the same time the total yield of activated carbon obtained is sufficiently high. At the same time it is possible to operate with commercially available sulphuric acid which represents an extremely favourable starting material, while the excess sulphuric acid can be used again for subsequent sulphonation operations. It was surprisingly found that activated carbons with different property profiles can be specifically produced by varying the reaction conditions in the procedure for the production of the activated carbon.

In a preferred embodiment of the process according to the invention the polymer is mixed with concentrated $H_2SO_4$ in step a) at ambient temperature for the sulphonation operation and heated to a sulphonation temperature in the range of between 110 and 160° C. In that operation, heating to the sulphonation temperature is effected at a rate of between about 3 and 20 K/min, preferably at a rate of between 10 and 20 K/min and particularly preferably at a rate of 15 K/min. As a result, an activated carbon comprising individual particles which are sintered together, with a comparatively porous structure, is obtained.

It is further preferred if the mixture of polymers and concentrated sulphuric acid is kept at the sulphonation temperature for a period in the range of between 0 and 60 min.

The high degree of sintering can further be influenced by the amount of sulphuric acid used being limited. Therefore, to achieve a high degree of sintering, it is preferred if the ratio of the mass of the concentrated sulphuric acid used to the mass of the polymer employed is between 1:1 and 2:1.

After the excess sulphuric acid has been filtered off from the sulphonated product, it is raised to a temperature of between 650 and 850° C. in step b) for the coking or pyrolysis operation, preferably a temperature in the range of between 700 and 800° C. It is particularly preferred for pyrolysis to be implemented at a temperature of 750° C.

The degree of sintering of the activated carbon is surprisingly also influenced by the speed at which the sulphonated product is heated to the pyrolysis temperature and by the holding time at the pyrolysis temperature. To obtain sintered bodies therefore a comparatively low heating rate and a comparatively short holding time at the pyrolysis temperature are the most appropriate. The sulphonated polymer is therefore raised to the pyrolysis temperature at a rate of between 1 and 10 K/min, preferably at a rate of between 5 and 10 K/min and particularly preferably at a rate in the range of between 8 and 10 K/min. In a preferred embodiment of the process according to the invention the pyrolysis temperature is held for a period of between 2 and 10 min, in particular for a period of between 3 and 7 min.

In a further particularly preferred embodiment of the present invention in step a) the polymer is mixed with concentrated sulphuric acid at ambient temperature for sulphonation and heated to a sulphonation temperature in the range of between 130 and 300° C., preferably sulphonation temperature in the range of between 130 and 200° C. The result obtained was surprisingly an activated carbon which is not sintered together and which is capable of trickle flow and which in addition has pores of extremely small diameter. It was surprisingly found that the condition of trickle flow capability occurs when the sulphur content in the pyrolysis coke is greater than 4%.

In a preferred configuration of this alternative form of the process, the step of heating to the sulphonation temperature is effected at a rate of between about 3 and 20 K/min, preferably at a rate of between 10 and 20 K/min.

To obtain a small pore radius in the activated carbon it is preferable for pyrolysis to be terminated after the pyrolysis temperature is reached. It is further preferable if the ratio of the mass of the concentrated sulphuric acid used to the mass of the polymer used is 2:1. This embodiment of the process according to the invention also provides that pyrolysis is effected at a temperature in the range of between 650 and 850° C., preferably in a temperature range of between 700 and 800° C. and particularly preferably at 750° C. It is however preferred if heating to the pyrolysis temperature is effected at a rate of between 20 and 50 K/min, preferably at a rate of 50 K/min, as the tendency to sintering is less with a higher heating rate. It is further preferred if the pyrolysis temperature is held for a period of between 0 and 10 min, in particular a period of between 3 and 7 min.

The narrow-pore activated carbon obtained is usually also subjected to a further activation operation to improve its properties. That activation operation is preferably effected at a temperature in the range of between 900 and 960° C., generally using an activation gas which comprises 55% by volume $N_2$, 10% by volume $CO_2$ and 35% by volume $H_2O$.

It is preferred in that respect if the activation gas is passed over the activated carbon as from a temperature of 500° C., with activation being effected for a period of between 30 and 360 minutes, in particular a period of between 60 and 120 minutes, in which respect however the loss due to burning which occurs during the activation operation is crucial. It is therefore particularly preferred for activation to be effected as far as a burning loss of between 40 and 75%, in particular as far as a burning loss of between 40 and 50%.

In a further embodiment according to the invention the polymer is mixed with concentrated sulphuric acid in step a) at ambient temperature for the sulphonation operation and is heated to a sulphonation temperature in the range of between 150 and 200° C., preferably 150° C. That variation in the sulphonation step surprisingly results in an activated carbon with a substantially comparatively large pore radius. That is advantageous in particular as, in comparison with a 'narrow-pore' activated carbon which has a high adsorption capacity, a 'wide-pore' activated carbon has particularly high adsorption kinetics, while the wide-pore activated carbon also comprises particles which are not sintered and which are capable of trickle flow. In that respect it is preferable if heating to the sulphonation temperature in step a) is effected at a rate of between about 1 and 20 K/min, preferably between 1 and 4 K/min, while the sulphonation temperature is preferably held over a period of between 0 and 240 min, particularly preferably over a period of between 120 and 240 min. The ratio of the mass of the concentrated sulphuric acid used to the mass of the polymer employed is preferably 2:1.

Pyrolysis of the polymer which is sulphonated in accordance with this alternative form of the sulphonation procedure is effected at preferred temperatures as already mentioned in connection with the other alternative forms of the sulphonation procedure, with heating to the pyrolysis temperature preferably being effected at a rate of between 3 and 50 K/min and particularly preferably at a rate of between 15 and 25 K/min. The pyrolysis temperature is then preferably held for a period of between 0 and 10 min, particularly preferably for a period of between 3 and 7 min.

In general an activation operation is then also effected in relation to the activated carbon in accordance with this alternative form of the process. That activation operation is preferably effected in a temperature range of between 900 and 960° C. and the activation gas is preferably of the same composition as the activation gas described in connection with production of the narrow-pore activated carbon. It is preferably also added as from a temperature of 500° C., while activation is preferably effected for a period of between 30 and 360 min, particularly preferably for a period of between 90 and 240 min, although the level of burning loss is of decisive significance. Activation is preferably therefore effected until a burning loss of between 60 and 90% is reached, in particular a value of 60%.

The present invention is described in greater detail hereinafter with reference to Examples.

A series of investigations were carried out in order to be able to compare the samples to each other. Besides ascertaining the level of burning loss, the sulphur content in the activated carbon, density values and porosity, the pore structure was also analysed by mercury porosimetry and $N_2$-sorptometry at 77 K. By means of those procedures, it was possible to ascertain inter alia the characteristic values for BET-surface area (DIN 66131), for the methylene blue titre for the identification of pores with a diameter <1.5 nm (see von Kienle, H. Bader, E. 'Activkohle und ihre industrielle Anwendung' F. Enke Verlag, Stuttgart 1980) for the pore volume and the pore volume distribution.

The BET-surface area for characterising the specific surface area was ascertained from the adsorption isotherm from nitrogen at 77 K. Evaluation was based on the assumption of a monomolecular covering of the internal surface of the particles, from which it is possible to calculate the numerical size of the surface area. The isotherm is recorded with a surface area measuring apparatus from Quantachrom. Calculation of the surface area was based on the BET-isotherm equation for the following three relative pressures: 0.05, 0.075 and 0.1.

The total pore volume and porosity were calculated from the gross and net density of the samples investigated.

Mercury porosimetry is used to determine the pore radius distribution in the meso- and macro-pore ranges (see von Kinele H., Bader, E., 'Aktivkohle und ihre industrielle Anwendung' F. Enke Verlag, Stuttgart 1980). That measuring procedure is based on the fact that liquid mercury does not wet the carbon surfaces. It penetrates into pores only under the effect of an external pressure. That pressure is a function of the pore size. In the present case, the operation of determining the percentage distribution of the tool pore volume in micro-, meso- and macro-pores is effected with a Porosimeter 2000 from Fison Instruments. With that process, mercury is pressed into the pores of the sample to be investigated in a stepwise procedure from vacuum (0.1 bar) up to a pressure of 2000 bars and the amount accommodated at the individual pressures is registered and recorded. As there is a relationship between pressure and pore radius, it is possible to ascertain the precise distribution of the pore volume.

On the basis of the maximum possible pressure of 2000 bars, it is only possible to detect pores of a diameter of larger than 7.6 nm. Therefore, as a departure from the IUPAC-standard the pore ranges are established as follows:

micropores<7.6 nm,
mesopores between 7.6 and 50 nm, and
macropores>50 nm.

The micropore proportion is formed from the difference of the total pore volume and the volume detected by mercury porosimetry (meso- and macro-pores).

For production of activated carbon, in each case the starting material used was an initial product in gel form of a cation exchanger of a styrene-divinylbenzene copolymer type. The proportion of divinylbenzene in the styrene-divinylbenzene copolymer was 8%. In the following Examples, that styrene-divinylbenzene copolymer was then mixed with a suitable amount of sulphuric acid and, under the conditions set forth hereinafter, subjected to sulphonation, pyrolysis and activation. After the sulphonation temperature was attained and after a suitable hold time, the material was immediately cooled down and the excess sulphuric acid was filtered off. The material was then suitably pyrolysed and activated. Then, to determine the degree of sintering, the coking residue obtained was sieved for a period of 5 minutes on a sieve of a mesh size of 1 mm with a sieving machine and the sieving residue was then determined.

Example 1

Sulphonation conditions

| | |
|---|---|
| Sulphonation temperature | 110° C. |
| Heating rate | 15 K/min |
| Hold time | 60 min |
| Mass ratio | $mH_2SO_4/m_{copolymer}$ 2:1 |

Coking conditions

| | |
|---|---|
| Heating rate | 9 K/min |
| Temperature | 750° C. |
| Sulphur content (coke) | 2.16% |
| Hold time | 5 min |
| Degree of sintering | 86.4% |

Example 2

Sulphonation conditions

| | |
|---|---|
| Sulphonation temperature | 120° C. |
| Heating rate | 15 K/min |
| Hold time | 60 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 2.04% |
| Hold time | 5 min |
| Degree of sintering | 83.5% |

Example 3

Sulphonation conditions

| | |
|---|---|
| Sulphonation temperature | 130° C. |
| Heating rate | 15 K/min |
| Hold time | 60 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 3.56% |
| Hold time | 5 min |
| Degree of sintering | 83.4% |

Example 4

Sulphonation conditions

| | |
|---|---|
| Sulphonation temperature | 140° C. |
| Heating rate | 15 K/min |
| Hold time | 0 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 1.95% |
| Hold time | 5 min |
| Degree of sintering | 87.5% |

Example 5

Sulphonation conditions

| | |
|---|---|
| Sulphonation temperature | 150° C. |
| Heating rate | 15 K/min |
| Hold time | 0 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 1.74% |
| Hold time | 5 min |
| Degree of sintering | 81% |

Example 6

Sulphonation conditions

| | |
|---|---|
| Sulphonation temperature | 160° C. |
| Heating rate | 15 K/min |
| Hold time | 0 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 1.87% |
| Hold time | 5 min |
| Degree of sintering | 83.3% |

The activated carbon produced in that way comprises porous sintered bodies, while it is to be noted that the sulphur content of the porous sintered bodies is below 4%. In the event of a change in the sulphonation conditions, for example upon an increase in the sulphonation temperature, the sulphur content admittedly increases, but at the same time there is a change in the appearance of the product from a sintered product to a product which is capable of trickle flow, as can be seen from Examples 7 to 9 hereinafter.

Example 7

Sulphonation conditions

| | |
|---|---|
| Sulphonation temperature | 140° C. |
| Heating rate | 15 K/min |
| Hold time | 15 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 5.6% |
| Hold time | 5 min |
| Degree of sintering | 22.1% |

-continued

Example 8

Sulphonation conditions

| | |
|---|---|
| Sulphonation temperature | 130° C. |
| Heating rate | 15 K/min |
| Hold time | 120 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 5.23% |
| Hold time | 5 min |
| Degree of sintering | 24.7% |

Example 9

Sulphonation conditions

| | |
|---|---|
| Sulphonation temperature | 170° C. |
| Heating rate | 15 K/min |
| Hold time | 0 min |
| Mass ratio | $mH_2SO_4/m_{copolymer} < 2:1$ |

Coking conditions

| | |
|---|---|
| Heating rate | 9 K/min |
| Temperature | 750° C. |
| Sulphur content (coke) | 6.27% |
| Hold time | 5 min |
| Degree of sintering | 16.8% |

By specific adjustment of the reaction conditions, it is possible to produce a 'narrow-pore' activated carbon which is distinguished by a high adsorption capacity, on the basis of its particularly high proportion of micropores, that is to say pores with a comparatively small pore radius. In that respect, the Examples set out hereinafter show precisely the properties of the activated carbon obtained and the yield in relation to the starting copolymer.

Example 10

Sulphonation conditions

| | |
|---|---|
| Sulphonation temperature | 200° C. |
| Heating rate | 10 K/min |
| Hold time | 0 min |
| Mass ratio | $mH_2SO_4/m_{copolymer} = 2:1$ |

Coking conditions

| | |
|---|---|
| Heating rate | 50 K/min |
| Temperature | 750° C. |
| Sulphur content (coke) | 6.61% |
| Hold time | 5 min |
| Degree of sintering | 2.3% |

Activation Conditions

| | |
|---|---|
| Temperature | 960° C. |
| Addition of activation gas | 500° C. |
| Duration | 90 min |
| Activation composition | $N_2$ (55% Vol.)/ $CO_2$ (10% Vol.)/ $H_2O_D$ (35% Vol.) |
| Sulphur content (activate) | 3.0% |
| Burning loss | 44.5% |

Properties

| | |
|---|---|
| Tap density | 0.553 g/cm$^3$ |
| Gross density | 0.938 g/cm$^3$ |
| MBT | 25 ml/0.1 g |
| BET | 1395 m$^2$/g |
| Total pore volume | 602 mm$^3$/g |
| Macropores | 55 mm$^3$/g = 9% |
| Mesopores | 21 mm$^3$/g = 3.5% |
| Micropores | 526 mm$^3$/g = 87.5% |
| Yield relative to copolymer | 54.2% |

Example 11

Sulphonation conditions

| | |
|---|---|
| Sulphonation temperature | 200° C. |
| Heating rate | 10 K/min |
| Hold time | 0 min |
| Mass ratio | $mH_2SO_4/m_{copolymer} = 2:1$ |

Coking conditions

| | |
|---|---|
| Heating rate | 50 K/min |
| Temperature | 750° C. |
| Sulphur content (coke) | 6.61% |
| Hold time | 5 min |
| Degree of sintering | 2.3% |

Activation Conditions

| | |
|---|---|
| Temperature | 960° C. |
| Addition of activation gas | 500° C. |
| Duration | 180 min |
| Activation composition | $N_2$ (55% Vol.)/ $CO_2$ (10% Vol.)/ $H_2O_D$ (35% Vol.) |
| Sulphur content (activate) | 1.95% |
| Burning loss | 73.2% |

Properties

| | |
|---|---|
| Tap density | 0.374 g/cm$^3$ |
| Gross density | 0.637 g/cm$^3$ |
| MBT | 40 ml/0.1 g |
| BET | 2236 m$^2$/g |
| Total pore volume | 1125 mm$^3$/g |
| Macropores | 125 mm$^3$/g = 11% |
| Mesopores | 136 mm$^3$/g = 12% |
| Micropores | 864 mm$^3$/g = 77% |
| Yield relative to copolymer | 26.1% |

Example 12

Sulphonation conditions

| | |
|---|---|
| Sulphonation temperature | 200° C. |
| Heating rate | 10 K/min |
| Hold time | 0 min |
| Mass ratio | $mH_2SO_4/m_{copolymer} = 2:1$ |

Coking conditions

| | |
|---|---|
| Heating rate | 20 K/min |
| Temperature | 750° C. |
| Sulphur content (coke) | 6.73% |
| Hold time | 5 min |
| Degree of sintering | 2.65% |

Activation Conditions

| | |
|---|---|
| Temperature | 900° C. |
| Addition of activation gas | 500° C. |
| Duration | 240 min |
| Activation composition | $N_2$ (55% Vol.)/ $CO_2$ (10% Vol.)/ $H_2O_D$ (35% Vol.) |
| Sulphur content (activate) | 2.93% |
| Burning loss | 60.8% |

Properties

| | |
|---|---|
| Tap density | 0.480 g/cm$^3$ |
| Gross density | 0.780 g/cm$^3$ |
| MBT | 31 ml/0.1 g |
| BET | 1746 m$^2$/g |
| Total pore volume | 822 mm$^3$/g |
| Macropores | 103 mm$^3$/g = 13% |
| Mesopores | 98 mm$^3$/g = 12% |
| Micropores | 621 mm$^3$/g = 75% |
| Yield relative to copolymer | 39.7% |

Example 13

Sulphonation conditions

| | |
|---|---|
| Sulphonation temperature | 200° C. |
| Heating rate | 10 K/min |
| Hold time | 0 min |
| Mass ratio | $mH_2SO_4/m_{copolymer} = 2:1$ |

Coking conditions

| | |
|---|---|
| Heating rate | 20 K/min |
| Temperature | 750° C. |
| Sulphur content (coke) | 6.73% |
| Hold time | 5 min |
| Degree of sintering | 2.65% |

Activation Conditions

| | |
|---|---|
| Temperature | 900° C. |
| Addition of activation gas | 500° C. |
| Duration | 180 min |
| Activation composition | $N_2$ (55% Vol.)/ $CO_2$ (10% Vol.)/ $H_2O_D$ (35% Vol.) |
| Sulphur content (activate) | 3.6% |
| Burning loss | 51.4% |

Properties

| | |
|---|---|
| Tap density | 0.561 g/cm$^3$ |
| Gross density | 0.957 g/cm$^3$ |
| MBT | 25 ml/0.1 g |
| BET | 1383 m$^2$/g |
| Total pore volume | 592 mm$^3$/g |
| Macropores | 55 mm$^3$/g = 9% |
| Mesopores | 46 mm$^3$/g = 8% |
| Micropores | 491 mm$^3$/g = 83% |
| Yield relative to copolymer | 49.3% |

Example 14

Sulphonation conditions

| | |
|---|---|
| Sulphonation temperature | 200° C. |
| Heating rate | 10 K/min |
| Hold time | 0 min |
| Mass ratio | $mH_2SO_4/m_{copolymer} = 2:1$ |

Coking conditions

| | |
|---|---|
| Heating rate | 20 K/min |
| Temperature | 750° C. |
| Sulphur content (coke) | 6.73% |
| Hold time | 5 min |
| Degree of sintering | 2.65% |

Activation Conditions

| | |
|---|---|
| Temperature | 960° C. |
| Addition of activation gas | 500° C. |
| Duration | 120 min |
| Activation composition | $N_2$ (55% Vol.)/ $CO_2$ (10% Vol.)/ $H_2O_D$ (35% Vol.) |
| Sulphur content (activate) | 2.73% |
| Burning loss | 56.7% |

Properties

| | |
|---|---|
| Tap density | 0.491 g/cm$^3$ |
| Gross density | 0.823 g/cm$^3$ |
| MBT | 30 ml/0.1 g |
| BET | 1594 m$^2$/g |
| Total pore volume | 752 mm$^3$/g |
| Macropores | 98 mm$^3$/g = 13% |
| Mesopores | 128 mm$^3$/g = 17% |
| Micropores | 526 mm$^3$/g = 70% |
| Yield relative to copolymer | 43.9% |

Accordingly it is possible in that way to produce 'narrow-pore' activated carbons with the following properties:

| | |
|---|---|
| Pore volume | 600 to 1120 mm$^3$/g |
| $V_{micro}$ | 530 to 860 mm$^3$/g (70 to 88%) |
| $V_{meso}$ | 21 to 130 mm$^3$/g (3 to 17%) |
| $V_{macro}$ | 50 to 120 mm$^3$/g (9 to 13%) |
| BFT-surface area | 1400 to 2300 m$^2$/g |
| MB-titre | 25 to 40 ml/0.1 g |
| Tap density | 0.37 to 0.56 g/cm$^3$ |

Examples 15 to 17 hereinafter show that a suitable variation in the reaction conditions also makes it possible to produce a correspondingly 'wide-pore' activated carbon, that is to say an activated carbon with a high content of macropores. 'Wide-pore' activated carbons of that kind are distinguished by particularly high adsorption kinetics, in contrast to the 'narrow-pore' activated carbons.

Example 15

Sulphonation conditions

| | |
|---|---|
| Sulphonation temperature | 150° C. |
| Heating rate | 2 K/min |
| Hold time | 240 min |
| Mass ratio | $mH_2SO_4/m_{copolymer} = 2:1$ |

Coking conditions

| | |
|---|---|
| Heating rate | 20 K/min |
| Temperature | 750° C. |
| Sulphur content (coke) | 6.66% |
| Hold time | 5 min |
| Degree of sintering | 2.2% |

Activation Conditions

| | |
|---|---|
| Temperature | 960° C. |
| Addition of activation gas | 500° C. |
| Duration | 120 min |
| Activation composition | $N_2$ (55% Vol.)/ $CO_2$ (10% Vol.)/ $H_2O_D$ (35% Vol.) |
| Sulphur content (activate) | 3.3% |
| Burning loss | 60.8% |

Properties

| | |
|---|---|
| Tap density | 0.444 g/cm$^3$ |
| Gross density | 0.668 g/cm$^3$ |
| MBT | 25 ml/0.1 g |
| BET | 1363 m$^2$/g |
| Total pore volume | 1028 mm$^3$/g |
| Macropores | 291 mm$^3$/g = 28% |
| Mesopores | 231 mm$^3$/g = 22 |
| Micropores | 506 mm$^3$/g = 50% |
| Yield relative to copolymer | 40.7% |

Example 16

Sulphonation conditions

| | |
|---|---|
| Sulphonation temperature | 200° C. |
| Heating rate | 10 K/min |
| Hold time | 0 min |
| Mass ratio | $mH_2SO_4/m_{copolymer} = 2:1$ |

Coking conditions

| | |
|---|---|
| Heating rate | 3 K/min |
| Temperature | 750° C. |
| Sulphur content (coke) | 7.52% |
| Hold time | 5 min |
| Degree of sintering | 9.5% |

Activation Conditions

| | |
|---|---|
| Temperature | 960° C. |
| Addition of activation gas | 500° C. |
| Duration | 240 min |
| Activation composition | $N_2$ (55% Vol.)/ $CO_2$ (10% Vol.)/ $H_2O_D$ (35% Vol.) |
| Sulphur content (activate) | 2.69% |
| Burning loss | 88.0% |

-continued

| Properties | |
|---|---|
| Tap density | 0.335 g/cm$^3$ |
| Gross density | 0.570 g/cm$^3$ |
| MBT | 35.5 ml/0.1 g |
| BET | 2069 m$^2$/g |
| Total pore volume | 1314 mm$^3$/g |
| Macropores | 191 mm$^3$/g = 14.5% |
| Mesopores | 321 mm$^3$/g = 24.5% |
| Micxopores | 802 mm$^3$/g = 61% |
| Yield relative to copolymer | 12.5% |

Example 17

| Sulphonation conditions | |
|---|---|
| Sulphonation temperature | 200° C. |
| Heating rate | 10 K/min |
| Hold time | 10 0 min |
| Mass ratio | mH$_2$SO$_4$/m$_{copolymer}$ = 2:1 |
| Coking conditions | |
| Heating rate | 20 K/min |
| Temperature | 750° C. |
| Sulphur content (coke) | 6.73% |
| Hold time | 5 min |
| Degree of sintering | 2.6% |
| Activation Conditions | |
| Temperature | 960° C. |
| Addition of activation gas | 500° C. |
| Duration | 240 min |
| Activation composition | N$_2$ (55% Vol.)/ CO$_2$ (10% Vol.)/ H$_2$O$_D$ (35% Vol.) |
| Sulphur content (activate) | 2.44% |
| Burning loss | 76.2% |
| Properties | |
| Tap density | 0.336 g/cm$^3$ |
| Gross density | 0.572 g/cm$^3$ |
| MBT | 36 ml/0.1 g |
| BET | 2160 mm$^2$/g |
| Total pore volume | 1301 mm$^3$/g |
| Macropores | 261 mm$^3$/g = 20% |
| Mesopores | 187 mm$^3$/g = 14% |
| Micropores | 853 mm$^3$/g = 66% |
| Yield relative to copolymer | 24.1% |

Therefore the picture in terms of properties of the 'wide-pore' activated carbons produced is as follows:

| Pore volume | 1000 to 1320 mm$^3$/g |
|---|---|
| $V_{micro}$ | 500 to 850 mm$^3$/g (50 to 65%) |
| $V_{meso}$ | 180 to 320 mm$^3$/g (14 to 25%) |
| $V_{macro}$ | 200 to 300 mm$^3$/g (15 to 30%) |
| BET-surface area | 1360 to 2160 m$^2$/g |
| MB-titre | 25 to 36 ml/0.1 g |
| Tap density | 0.34 to 0.44 g/cm$^3$ |

In order to make clear the difference in the activated carbon according to the invention, in comparison with conventional, commercially obtainable activated carbons, two further Examples of the activated carbon according to the invention were produced, and subjected to detailed investigation of their properties, just like the commercially available activated carbons SAR-0 from Kureha, Japan and Ambersorb XEN 572, from Rohm & Haas, USA. The results of those investigations are set out in Table 1.

Example 18

| Sulphonation conditions | |
|---|---|
| Sulphonation temperature | 150° C. |
| Heating rate | 3 K/min |
| Hold time | 4 hours |
| Mass ratio | mH$_2$SO$_4$/m$_{copolymer}$ = 2:1 |
| Coking conditions | |
| Heating rate | 20 K/min |
| Temperature | 750° C. |
| Activation Conditions | |
| Temperature | 960° C. |
| Activation composition | N$_2$ (35% Vol.)/ CO$_2$ (10% Vol.)/ H$_2$O$_D$ (55% Vol.) |
| Burning loss | 60.8%. |

Example 19

| Sulphonation conditions | |
|---|---|
| Sulphonation temperature | 200° C. |
| Heating rate | 10 K/min |
| Mass ratio | mH$_2$SO$_4$/m$_{copolymer}$ = 2:1 |
| Coking conditions | |
| Heating rate | 3 K/min |
| Temperature | 750° C. |
| Activation Conditions | |
| Temperature | 960° C. |
| Activation composition | N$_2$ (35% Vol.)/ CO$_2$ (10% Vol.)/ H$_2$O$_D$ (55% Vol.) |
| Burning loss: | 44.3% |

The pore structure was analysed by means of N$_2$-sorptometry at 77 K (see von Kienle, H., Bader E., 'Aktivkohle und ihre industrielle Anwendung' F. Enke Verlag, Stuttgart 1980) and Hg-porosimetry, from which there were derived the pore radius distribution and the specific surface area (BET) [DIN 66131] as well as the micropore volume using the DUBININ-method (see Patrick, J. W. 'Porosity in carbons' E. Arnold, London 1995). The methylene blue titre was further measured as a measurement index in respect of the adsorption capacity of molecules of about 1–1.5 nm diameter (see von Kienle, H., Bader, E., 'Aktivkohle und ihre industrielle Anwendung', F. Enke Verlag, Stuttgart 1980) as well as butane adsorption (0.5% volume n-butane in helium). The last measurement was used to derive the equilibrium loading as well as the adsorption speed.

TABLE 1

Comparison of activated carbon samples according to the invention with commercial reference products

| | | Activated carbon of the invention | | Reference products | |
|---|---|---|---|---|---|
| | | Example 18 | Example 19 | SAR-O (Kureha: Jap) | Ambersorb XEN 572 (Rohm & Haas: USA) |
| Pore volume comprising pores: | [mm³/g] | 1028 | 602 | 596 | 945 |
| $r_p < 3.8$ nm | [mm³/g] | 506 (49.2%) | 526 (87.4%) | 509 (85.4%) | 381 (40.3%) |
| 3.8 nm $< r_p < 25$ nm | [mm³/g] | 231 (22.5%) | 21 (3.5%) | 53 (8.9%) | 532 (56.3%) |
| $r_p < 25$ nm | [mm³/g] | 291 (28.3%) | 55 (9.1%) | 34 (5.7%) | 32 (3.4%) |
| Selected pore volume proportions in the pore radius range | | | | | |
| 0.8–1 nm | [mm³/g] | 131 | 142 | 179 | 96 |
| 1–2 nm | [mm³/g] | 300 | 294 | 355 | 146 |
| 10–30 nm | [mm³/g] | 170 | 7 | 22 | 490 |
| 100–1000 nm | [mm³/g] | 110 | 12 | 12 | 10 |
| Micropore volume with DUBININ | | | | | |
| from $N_2$-isotherm | [mm³/g] | 522 | 550 | 603 | 465 |
| from benzene isotherm (20° C.) | [mm³/g] | 497 | 519 | 501 | 409 |
| Mean micropore width | | | | | |
| from $N_2$-isotherm | [nm] | 1.65 | 1.69 | 1.95 | 1.28 |
| from benzene isotherm (20° C.) | [nm] | 1.36 | 1.12 | 1.29 | 0.84 |
| Specific area (BET) | [m²/g] | 1363 | 1387 | 1319 | 1126 |
| Methylene blue titre (MBT) | [ml/0.1 g] | 25 | 25 | 24.5 | 23.5 |
| Butane adsorption/-desorption | | | | | |
| equilibrium loading | [%] | 15.95 | 17.22 | 15.09 | 16.27 |
| Speed adsorption | [%/min] | 15.0 | 4.5 | 10.0 | 6.9 |
| speed desorption* | [%/min] | 12.0 | 5.0 | 8.0 | 6.0 |
| Benzene adsorption equilibrium loading | | | | | |
| pi/ps 0.001 | [%] | 20.5 | 24.1 | 21.3 | 22.3 |
| pi/ps 0.01 | [%] | 31.4 | 34.6 | 32.3 | 29.1 |
| pi/ps 0.1 | [%] | 40.1 | 42.3 | 40.4 | 34.1 |
| pi/ps 0.9 | [%] | 47.6 | 45.6 | 44.1 | 42.8 |
| Tap density | [g/cm³] | 0.440 | 0.553 | 0.589 | 0.482 |

*Desorption to 50% residual loading

What is claimed is:

1. A process for the production of activated carbon, having porous sintered bodies from polymers with aromatic nuclei, comprising the following steps:
    a) mixing the polymer with concentrated $H_2SO_4$ at ambient temperature and heating the mixture to a sulphonation temperature in the range of between 110 and 160° C., at a rate between 3 and 20 K/min wherein the ratio of the mass of concentrated $H_2SO_4$ used to the mass of the polymer is used between 0.5:1 and 4:1 to form a sulphonated polymer;
    b) filtering of the excess sulphuric acid after the sulphonation operation and coking or pyrolysing the sulphonated polymer; and
    c) activating the coke obtained by the coking or pyrolysing operation.

2. A process according to claim 1, wherein in step a) the heating operation is effected at a rate of between 10 and 20 K/min.

3. A process according to claim 1, wherein in step a) the heating operation is effected at a rate of 15 K/min.

4. A process according to claim 1, wherein the mixture of the polymer and concentrated $H_2SO_4$ is held at a sulphonation temperature for a time in the range-between 0 and 60 minutes after the sulphonation temperature is reached.

5. A process according to claim 1, wherein the ratio of the mass of the concentrated $H_2SO_4$ used to the mass of the polymer used is between 1:1 and 2:1.

6. A process according to claim 1, wherein after the excess sulphuric acid is filtered off in step b) the sulphonated polymer is raised to a temperature in the range between 650 and 850° C. for the coking or pyrolysing operation.

7. A process according to claim 1, wherein after the excess sulphuric acid is filtered off in step b) the sulphonated polymer is raised to a temperature in the range of between 700 and 800° C. for the coking or pyrolysing operation.

8. A process according to claim 1, wherein after the excess sulphuric acid is filtered off in step b) the sulphonated polymer is heated to a temperature of 750° C. for the coking or pyrolysing operation.

9. A process according to claim 6, wherein the sulphonated polymer is raised to the pyrolysis temperature at a speed of between 1 and 10 K/min.

10. A process according to claim 6, wherein the sulphonated polymer is raised to the pyrolysing temperature at a speed of between 5 and 10 K/min.

11. A process according to claim 6, wherein the sulphonated polymer is raised to the pyrolysing temperature at a speed of between 8 and 10 K/min.

12. A process according to claim 6, wherein the pyrolysing temperature is held for a period between 2 and 10 minutes.

13. A process according to claim 6, wherein the pyrolysing temperature is held for a period between 3 and 7 minutes.

14. A process for the production of activated carbon capable of trickle flow from polymers with aromatic nuclei, comprising the following steps:
   a) mixing the polymer with concentrated $H_2SO_4$ at ambient temperature and heating the mixture to a sulphonation temperature in the range between 130 and 300° C., at a rate of between 3 and 20 K/min., wherein the mass of concentrated $H_2SO_4$ used to the mass of the polymer used is between 0.5:1 and 4:1 to form a sulphonated polymer;
   b) filtering of the excess sulphuric acid in the sulphonation operation and coking or pyrolysing the sulphonated polymer; and
   c) activating the coke obtained by the coking or pyrolysing operation.

15. A process according to claim 14, wherein the mixture in step a) is heated to a sulphonation temperature in the range of between 130 and 200° C.

16. A process according to claim 14, wherein the heating operation in step a) is effected at a rate of between 10 and 20 K/min.

17. A process according to claim 14, wherein the heating operation in step a) is effected at a rate of about 15 K/min.

18. A process according to claim 14, wherein the sulphonation operation is concluded after the sulphonation temperature is reached.

19. A process according to claim 14, wherein the ratio of the mass of the concentrated $H_2SO_4$ used to the mass of the polymer used is 2:1.

20. A process according to claim 14, wherein after the excess sulphuric acid is filtered off in step b) the sulphonated polymer is raised to a temperature in the range of between 650 and 850° C. for the coking or pyrolysing operation.

21. A process according to claim 14, wherein after the excess sulphuric acid is filtered off in step b) the sulphonated polymer is raised to a temperature in the range between 700 and 800° C. for the coking or pyrolysing operation.

22. A process according to claim 14, wherein after the excess sulphuric acid is filtered off in step b) the sulphonated polymer is raised to a temperature of 750° C. for the coking or pyrolysing operation.

23. A process according to claim 20, wherein the heating for reaching the pyrolysing temperature is effected at a rate of between 20 and 50 K/min.

24. A process according to claim 20, wherein the pyrolysing temperature is held for a period of between 0 and 10 minutes after the pyrolysing temperature is reached.

25. A process according to claim 20, wherein the pyrolysing temperature is held for a period of between 3 and 7 minutes.

26. A process according to claim 14, wherein the activation of the coke obtained by coking or pyrolysing is effected at a temperature in the range between 900 and 960° C.

27. A process according to claim 26, wherein the activation gas comprises 55% vol. $N_2$, 10% vol. $CO_2$ and 35% vol. $H_2O$.

28. A process according to claim 26, wherein the activation gas is passed over the activated carbons as from a temperature of 500° C.

29. A process according to claim 26, wherein the activation is effected for a period between 30 and 360 minutes.

30. A process according to claim 26, wherein the process is effected as far as to a burning loss of between 40 and 75%.

31. A process according to claim 26, wherein the process is effected as far as to a burning loss of between 40 and 60%.

32. A process for the production of narrow-pore activated carbon from polymers with aromatic nuclei, comprising the following steps:
   a) mixing the polymer with concentrated $H_2SO_4$ at ambient temperature and heating the mixture to a sulphonation temperature in the range between 150 and 200° C., at a rate of between 1 and 10 K/min. wherein the ratio of the mass of concentrated $H_2SO_4$ used to the mass of the polymer used is 2:1 to form a sulphonated polymer;
   b) filtering of the excess sulphuric acid after the sulphonation operation and coking or pyrolysing the sulphonated polymer; and
   c) activating the coke obtained by the coking or pyrolysing operation.

33. A process according to claim 32, wherein the sulphonation temperature is held for 0 minutes after the sulphonation temperature is reached.

34. A process according to claim 32, wherein after the filtration of the excess sulphuric acid in step b) the sulphonated polymer is brought to a temperature in the range of between 650 and 850° C. for the coking or pyrolysing operation.

35. A process according to claim 32, wherein after the filtration of the excess sulphuric acid in step b) the sulphonated polymer is brought to a temperature in the range of between 700 and 800° C. for the coking operation.

36. A process according to claim 32, wherein after the filtration of the excess sulphuric acid in step b) the sulphonated polymer is brought to a temperature of 750° C. for the coking or pyrolysing operation.

37. A process according to claim 34, wherein the heating to the pyrolysing temperature is effected at a rate between 20 and 50 K/min.

38. A process according to claim 34, wherein the pyrolysing temperature is held for a period between 0 and 10 minutes after the pyrolysing temperature has been reached.

39. A process according to claim 34, wherein the pyrolysing temperature is held for a period of between 3 and 7 minutes.

40. A process according to claim 32, wherein the activation is effected in a temperature range of between 900 and 960° C.

41. A process according to claim 32, wherein the activation gas comprises 55% vol. $N_2$, 10% vol. $CO_2$ and 35% vol. $H_2O$.

42. A process according to claim 32, wherein the activation gas is added as from a temperature of 500° C.

43. A process according to claim 32, wherein the activation is effected for a period of between 30 and 360 minutes.

44. A process according to claim 32, wherein the activation is effected for a period of between 90 and 240 minutes.

45. A process according to claim 32, wherein the activation operation is effected until a burning loss of between 40 and 90% is reached.

46. A process according to claim 32, wherein the activation operation is effected until a burning loss of between 44 and 74% is reached.

47. A process for the production of wide-pore activated carbon from polymers with aromatic nuclei comprising the following steps:
   a) mixing the polymer with concentrated $H_2SO$ at ambient temperature and heating the mixture to the sulphonation temperature in the range of between 150 and 200° C., at a rate of between 2 and 10 K/min., wherein the ratio of the mass of concentrated $H_2SO$ used to the mass of the polymer used is 2:1 to form a sulphonated polymer;
   b) filtering of the excess sulphuric acid after the sulphonation operation and coking or pyrolysing the sulphonated polymer; and
   c) activating the coke obtained by the coking or pyrolysing operation.

48. A process according to claim 47, wherein in step a) the polymer is heated to a sulphonation temperature of 150° C.

49. A process according to claim 47, wherein the heating operation in step a) is effected at a rate of between 1 and 4 K/min.

50. A process according to claim 47, wherein the sulphonation temperature is held for a period between 0 and 240 minutes after the sulphonation temperature is reached.

51. A process according to claim 47, wherein the sulphonation temperature is held for a period of 240 minutes.

52. A process according to claim 47, wherein after the filtration of the excess sulphuric acid in step b) the sulphonated polymer is brought to a temperature in the range of between 650 and 850° C. for the coking or pyrolysing operation.

53. A process according to claim 47, wherein after the filtration of the excess sulphuric acid in step b) the sulphonated polymer is brought to a temperature in the range between 700 and 800° C. for the coking or pyrolysing operation.

54. A process according to claim 47, wherein after filtration of the excess sulphuric acid in step b) the sulphonated polymer is brought to a temperature of 750° C. for the coking or pyrolysing operation.

55. A process according to claim 47, wherein the heating to the pyrolysing temperature is effected at a rate between 3 and 20 K/min.

56. A process according to claim 47, wherein the pyrolysing temperature is held for a period of between 3 and 7 minutes.

57. A process according to claim 47, wherein the pyrolysing temperature is held for a period of 5 minutes.

58. A process according to claim 47, wherein the activation is effected in a temperature range of between 900 and 960° C.

59. A process according to claim 47, wherein the activation is effected at a temperature of 960° C.

60. A process according to claim 47, wherein the activation gas comprises 55% vol. $N_2$, 10% vol. $CO_2$ and 35% vol. $H_2O$.

61. A process according to claim 47, wherein the activation gas is added as from a temperature of 500° C.

62. A process according to claim 47, wherein the activation is effected for a period of between 120 and 240 minutes.

63. A process according to claim 47, wherein the activation operation is effected until a burning loss of between 60 and 90% is reached.

64. A process according to claim 47, wherein the activation operation is effected until a burning loss of 60% is reached.

* * * * *